3,475,483
ISOMERIZATION OF MALEATES WITH
ALKYL CHLOROCARBONATE
Rostyslaw Dowbenko, Gibsonia, Pa., assignor to PPG
Industries, Inc., Pittsburgh, Pa., a corporation of
Pennsylvania
No Drawing. Filed Feb. 23, 1966, Ser. No. 529,192
Int. Cl. C07c 69/60
U.S. Cl. 260—485                               6 Claims

ABSTRACT OF THE DISCLOSURE

The invention relates to a method of isomerizing a maleic acid half-ester to the corresponding fumaric acid half-ester which comprises heating the maleic acid half-ester in the presence of a catalytic amount of lower alkyl chlorocarbonate, and further, to a method of preparing beta-hydroxyalkyl esters in an integrated process comprising isomerization of a maleic half-ester and subsequent reaction with a 1,2-alkylene oxide.

---

This invention relates to the conversion of cis, alpha, beta-unsaturated dicarboxylic acid half-esters to their trans isomers. Further, this invention relates to an integrated process for the production of β-hydroxyalkyl fumarates.

Interest has recently been aroused in the use of fumaric acid derivatives as comonomers in acrylic polymers of both the thermoplastic and thermosetting variety. Due to the commercial implication of these materials, new monomers having more desirable properties and new methods for producing such monomers more economically and in high purity have been sought.

It has now been found that a maleic acid half-ester, corresponding to the formula:

(I) 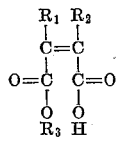

where $R_1$ and $R_2$ are independently selected from the group consisting of hydrogen, chlorine, bromine, fluorine, and lower alkyl radicals, and where $R_3$ is an organic radical derived by elimination of the hydroxy group from an alcohol capable of forming a maleic acid half-ester, may be isomerized in the presence of a catalytic amount of an alkyl chlorocarbonate (ROCOCl) which R is lower alkyl, such as methyl, ethyl, or butyl, to form the corresponding fumaric acid half-ester isomer.

As stated previously, one purpose of this invention is to provide a simple, rapid and economical method of preparing half-esters of fumaric acid.

The isomerization may be conducted by charging the maleic acid half-ester into a reaction vessel and heating. The catalyst is then added and the reactor maintained at the desired temperature. The isomerization may also be carried out in the presence of an inert solvent or diluent such as benzene, toluene, carbon tetrachloride, chloroform, tetrachloroethane, octane, and the like. One method of controlling the temperature of the reaction is by the use of a solvent or diluent boiling at the desired temperature and maintaining the reaction at reflux.

The temperature at which the isomerization is conducted may be varied widely. Although the reaction proceeds at room temperature, the time required to obtain substantial yields is prohibitive by commercial standards. Preferably, the isomerization is conducted at a temperature of from about 50° C. to about 125° C. or higher. Most preferably, the reaction is conducted at about 100° C. At temperatures above about 125° C., while the desired product is still obtained, undesirable side reactions such as disproportionation cause a reduction in the apparent percentage conversion.

The amount of isomerization catalyst employed is usually from about 0.05 percent to about 5 percent. Larger amounts may be used, but apparently do not appreciably increase the conversion. Preferably, the isomerization catalyst is employed in an amount of from about 0.25 percent to about 2 percent. It has also been found that maleic anhydride or substituted maleic anhydrides may be converted by an integrated process to organo beta-hydroxyalkyl fumarates without isolation or purification of intermediate products.

The anhydride utilized in the process of this invention may be maleic anhydride and a mono- or disubstituted maleic anhydride such as those corresponding to the formula:

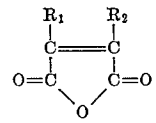

where $R_1$ and $R_2$ are independently selected from the group consisting of hydrogen, chlorine, bromine, fluorine, and lower alkyl radicals. Examples of such anhydrides include methyl maleic anhydride, dimethyl maleic anhydride, chloromaleic anhydride, dichloromaleic anhydride, bromomaleic anhydride, and the like.

The maleic anhydride or substituted maleic anhydride is first reacted with a monohydric alcohol to form the corresponding half-ester. While no catalyst is essential in conducting this reaction, it has been found that an amine catalyst at least in some instances promotes the reaction, or allows the reaction to proceed at a practical rate at a lower temperature. To the reaction mixture is then added a catalytic amount of an isomerization catalyst, isomerizing the maleic acid half-ester present in the reaction mixture to the corresponding fumaric acid half-ester. After the isomerization is complete, a 1,2-alkylene oxide is added to the reaction mixture and the hydrogen fumarate converted to the corresponding organo β-hydroxyalkyl fumarate.

Essentially, any monohydric alcohol can be employed to produce the half-esters, since the intermediate products of the invention are achieved with any monohydric alcohol, which, when reacted with the anhydride ring, forms a half-ester, for example:

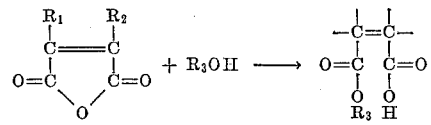

where $R_3$ is an organic radical derived by elimination of the hydroxyl group from the alcohol employed to open the anhydride ring to form a half-ester.

The preferred alcohols are alkanols containing up to 10 carbon atoms including methanol, ethanol, 1-propanol, 2-propanol, 1-butanol, 2-methyl - 1 - propanol, 2-butanol-1-pentanol, 2-ethyl - 1 - hexanol. Other alcohols include lower alkyl monoethers of ethylene glycol (Cellosolves) and the corresponding monoethers of diethylene glycol (Carbitol). Other alcohols which may be utilized are longer chain alcohols such as linseed fatty alcohols and other fatty alcohols, longer chain monoethers of glycols, cyclic alcohols such as cyclopentanol, cyclohexanol and furyl alcohol and aromatic alcohols such as benzyl alcohol, as well as halogen substituted derivatives of the foregoing.

The alkylene oxide utilized in the process of this invention may be any 1,2-alkylene oxide. Examples of such alkylene oxides are ethylene oxide, propylene oxide, butylene oxide, and the like. Preferably, the alkylene oxide contains 2 to 4 carbon atoms. More preferably, the alkylene oxide is selected from the group consisting of ethylene oxide and propylene oxide.

Alternatively, a corresponding maleate half-ester may be utilized as a starting material, eliminating the step of its production from the anhydride and the monohydric alcohol compound. Many of these materials are items of commerce, for example, butyl hydrogen maleate.

The first stage reaction between the anhydride and the hydroxyl compound may be conducted at a temperature of from about 0° C. to about 100° C. or higher. Preferably, the reaction is conducted at a temperature of from about 50° C. to about 80° C. The proportions of the reactants may be varied widely. The use of less than one mole of the hydroxy compound per mole of anhydride obviously results in a lower percent conversion. Likewise, where a large excess of hydroxy compound is employed, especially at higher temperatures, some diester formation will occur, lessening the percent conversion of the desired product. Preferably, from about 1.0 mole to about 1.1 mole of the hydroxy compound is employed for each mole of anhydride.

As previously stated, while not essential, it is desirable to have an amine type catalyst present in the reaction mixture during the initial esterification step. Suitable amines are tertiary amines such as triethylamine and triisopropylamine.

The second stage of the reaction is initiated by the addition of a catalytic amount of isomerization catalyst described above, alkyl chlorocarbonate (ROCOCl), in an amount and at a temperature as described above.

In the third stage of the reaction, the alkylene oxide is added to the reaction. Preferably, a slight molar excess, about 0.1 to 0.2 mole of the alkylene oxide, is used to achieve maximum conversion. Less than a molar amount of the alkylene oxide may be employed; however, the overall percent conversion will obviously be reduced. Likewise, when a large excess of alkylene oxide is employed, the desired monoester is still produced under mild conditions; however, some diester is formed, reducing the total conversion.

Preferably, the alkylene oxide addition is carried out by heating the reaction product of stage two to the desired reaction temperature. The alkylene oxide is then incrementally added over a period of time, usually from about 1 to 2 hours. When the addition is completed, the reaction mixture is preferably maintained at the desired reaction temperature until the reaction has gone substantially to completion. The total reaction time may be varied from about 2 to about 15 hours, or more. Usually, the reaction is substantially complete in about 10 to about 15 hours.

The third stage reaction temperature may be varied over a wide range. The reaction is preferably conducted at a temperature of from about 50° C. to about 80° C. While the reaction proceeds at room temperature, the rate is substantially slower than at slightly elevated temperatures. At higher temperatures, volatilization of the reactants and undesirable side reactions complicate the procedure and reduce the yield; however, the desired product is formed up to about 125° C.

Alternatively, the total charge of the third stage reactants may be mixed together and reacted. The use of pressure vessels may be desired when the reaction is conducted in this manner, especially when elevated temperatures are employed in order to maintain the reactants in solution.

If desired, a catalyst may be added at the beginning of the third stage to promote the hydroxyalkyl ester formation. Suitable agents when added in catalytic amounts include triethylamine, potassium hydroxide, triethylamine hydrochloride and trimethyl benzene ammonium chloride.

The products of the integrated process of this invention are β-hydroxyalkyl fumarates corresponding to the formula:

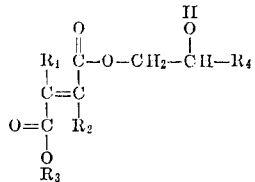

where $R_1$ and $R_2$ are independently selected from the group consisting of hydrogen, chlorine, bromine, fluorine and lower alkyl radicals, and where $R_3$ is an organic radical derived by the elimination of the hydroxyl group from the alcohol employed to open the anhydride ring, and $R_4$ is an alkyl radical or hydrogen.

Examples of such compounds include:

Butyl β-hydroxyethyl fumarate
Ethyl β-hydroxyethyl fumarate
Propyl β-hydroxyethyl fumarate
2-ethylhexyl β-hydroxypropyl fumarate
2-ethylhexyl β-hydroxyethyl fumarate These compounds, as well as the fumaric acid half-esters formed by the isomerization reaction, find utility as comonomers in vinyl polymerizations, building residual functionality into the polymer chain.

There are set forth below several examples which illustrate the methods of producing the compounds of this invention and the manner in which these compounds were isolated and identified. These examples are, of course, given by way of illustration only and should not be construed as limiting the invention to the particular details thereof. All parts and percentages set forth, as is true throughout the specification, are by weight unless otherwise specified. All reduced pressure boiling points are stated in millimeters of mercury.

EXAMPLE I

Isomerization of butyl hydrogen maleate with methyl chlorocarbonate

Into a reactor equipped with a reflux condenser, stirrer and thermometer were charged 172.2 grams of butyl hydrogen maleate and 1.72 grams (1 percent of methyl chlorocarbonate). The reaction mixture was then heated to 100° C. and maintained at that temperature for 14 hours. During the reaction, a solid appeared coming out of the solution. 17.2 gram samples were withdrawn from reaction flasks at reaction times of 1, 3, 6½, and 14 hours.

Samples were analyzed for percent conversion in the following manner: A 17.2 gram sample withdrawn after one hour was charged into a flask with 30 frams of butanol, 20 cubic centimeters of toluene and 0.5 gram of concentrated sulphuric acid. The flask was equipped with a stirrer, thermometer, condenser and water trap. The reaction mixture was heated to reflux. After 1 hour and 20 minutes, 2.8 cubic centimeters of water had been withdrawn from the reactor. Reaction mixture was cooled to room temperature and washed with sodium bicarbonate solution and a sodium chloride solution. The dried, organic layer was submitted to gas chromatography which showed 34.5 percent dibutyl fumarate indicating that in one hour the methyl chlorocarbonate catalyst had produced 34.5 percent conversion. Examination of the remaining samples in a similar manner showed 74.6 percent fumarate at the end of 3 hours, 87.3 percent fumarate at the end of 6.5 hours, and 100 percent at the end of 14 hours.

EXAMPLE II

Under the same reaction conditions as in Example I, the catalyst level was increased to 2 and 3 percent. The respective percent conversions which were measured in the manner of Example I were as follows:

Conversion with 2 percent methyl chlorocarbonate

| Time (hours): | Percent fumarate |
|---|---|
| 1 | 57.1 |
| 3 | 90.9 |
| 6.5 | 99.0 |
| 14 | 100.0 |

Conversion with 3 percent methyl chlorocarbonate

| Time (hours): | Percent fumarate |
|---|---|
| 1 | 68.8 |
| 3 | 95.2 |
| 6.5 | 100.0 |
| 14 | 100.0 |

EXAMPLE III

Isomerization of butyl hydrogen maleate with ethyl chlorocarbonate

In a manner identical to Examples I and II, with the exception that ethyl chlorocarbonate was substituted for the methyl chlorocarbonate, the following percentage conversions were measured in the manner of Example I:

Conversion with 1 percent ethyl chlorocarbonate

| Time (hours): | Percent fumarate |
|---|---|
| 1 | 47.0 |
| 3 | 78.3 |
| 6.5 | 93.5 |
| 14 | 97.5 |

Conversion with 2 percent ethyl chlorocarbonate

| Time (hours): | Percent fumarate |
|---|---|
| 1 | 53.4 |
| 3 | 88.5 |
| 6.5 | 100.0 |
| 14 | 100.0 |

Conversion with 3 percent ethyl chlorocarbonate

| Time (hours): | Percent fumarate |
|---|---|
| 1 | 63.5 |
| 3 | 94.1 |
| 6.5 | 99.5 |
| 14 | 100.0 |

EXAMPLE IV

Isomerization of butyl hydrogen maleate with butyl chlorocarbonate

In reactions identical to Examples I and II, with the exception that butyl chlorocarbonate was substituted for methyl chlorocarbonate, the following results were measured in the manner of Example I:

Conversion with 1 percent butyl chlorocarbonate

| Time (hours): | Percent fumarate |
|---|---|
| 1 | 34.2 |
| 3 | 68.2 |
| 6.5 | 92.3 |
| 14 | 98.4 |

Conversion with 2 percent butyl chlorocarbonate

| Time (hours): | Percent fumarate |
|---|---|
| 1 | 56.0 |
| 3 | 91.8 |
| 6.5 | 99.8 |
| 14 | 100.0 |

Conversion with 3 percent butyl chlorocarbonate

| Time (hours): | Percent fumarate |
|---|---|
| 1 | 73.9 |
| 3 | 98.2 |
| 6.5 | 100.0 |
| 14 | 100.0 |

EXAMPLE V

Preparation of butyl hydroxypropyl fumarate

Into a reactor equipped with a reflux condenser, stirrer, thermometer, and water jacket were charged 981 grams of maleic anhydride and 778 grams of butanol. The above mixture was then heated slowly. A slight exotherm was apparent at 50° C. The reaction mixture was heated to 100° C. and maintained at that temperature for 6 hours. The reaction mixture was then cooled to about 50° C. and 35 grams of ethyl chlorocarbonate added. The reaction mixture was then heated to 100° C. and maintained at that temperature for 6 hours. The reaction mixture was then cooled to 75° C.

507 grams of propylene oxide were then added dropwise over a period of 3.3 hours while maintaining the temperature at about 75° C. The reaction was heated an additional 5 hours at 75° C., then cooled to room temperature. The reaction mixture was then washed with aqueous sodium bicarbonate and then poured into a separatory funnel to which ethyl acetate was added. The ethyl acetate layer was washed twice with sodium bicarbonate solution and filtered. The product was then isolated by removing the solvent under a vacuum at a temperature below 50° C. The percent conversion based on butyl hydrogen maleate was 86.6 percent.

The progress of the reaction in the various stages and the degree of conversion can be conveniently followed by periodically withdrawing samples and determining infrared spectrum and acid number, and by the use of a gas chromatograph.

The esters produced by the process of this invention may be isolated from the reaction mixture by conventional techniques known to the organic chemist. The desired ester may be isolated by distilling the reaction mixture under reduced pressure. Alternatively, where the bulk of impurities constitute relatively volatile starting materials, these may be removed by distillation or by passing a gas such as nitrogen through the reaction mixture to remove such relatively volatile impurities. The resulting residue, comprising mainly the esters of the invention may be employed in subsequent reactions as such. Other methods of separation include chromatography and liquid-liquid extraction with appropriate solvents.

Likewise, where the reaction is terminated at the end of stage two, the resultant fumarate half-ester may be isolated by the above techniques.

Although specific examples of the invention have been set forth, it is not intended to limit the invention solely thereto, but to include all the variations and modifications falling within the scope of the appended claims.

I claim:

1. A method of isomerizing a maleic acid half-ester, corresponding to the formula:

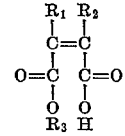

where $R_1$ and $R_2$ are hydrogen and $R_3$ is an organic radical derived by eliminating the hydroxyl group from a monohydric alcohol capable of forming a maleic acid half-ester, to the corresponding fumaric acid half-ester, which comprises heating the maleic acid half-ester in the presence of a catalytic amount of lower alkyl chlorocarbonate.

2. A method of isomerizing an alkyl hydrogen maleate to the corresponding alkyl hydrogen fumarate which comprises heating an alkyl hydrogen maleate in the presence of a catalytic amount of lower alkyl chlorocarbonate.

3. A method of preparing β-hydroxyalkyl esters which comprises:
(A) heating an anhydride corresponding to the formula:

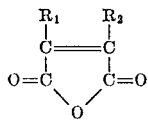

where $R_1$ and $R_2$ are hydrogen with a monohydric alcohol for a time sufficient to open the anhydride ring and form the corresponding maleate half-ester,
(B) adding a catalytic amount of lower alkyl chlorocarbonate, and heating the reaction for a time sufficient to isomerize the maleate half-ester in the reaction mixture to the corresponding fumarate half-ester,
(C) heating the reaction product of step (B) with a 1,2-alkylene oxide for a time sufficient to esterify the free carboxyl group of the fumarate half-ester forming a β-hydroxyalkyl ester group.

4. The method as in claim 3 wherein the alkylene oxide in step (C) is selected from the group consisting of ethylene oxide and propylene oxide.

5. The method as in claim 3 wherein the monohydric alcohol is an alkanol.

6. The method as in claim 5 wherein the alkylene oxide is selected from the group consisting of ethylene oxide and propylene oxide.

References Cited

UNITED STATES PATENTS 3,078,302    2/1963    Franz et al. _____ 260—485
3,190,899    6/1965    Walton et al. _____ 260—485

OTHER REFERENCES

Kirk-Othmer Encyclopedia of Chemical Technology, 2nd Ed., vol. 4, Interscience Publishers, N.Y., 1964, pp. 386–387, TP9E68.

JAMES A. PATTEN, Primary Examiner

E. JANE SKELLY, Assistant Examiner

U.S. Cl. X.R.

260—347.4